(12) United States Patent
Evans et al.

(10) Patent No.: US 9,776,152 B2
(45) Date of Patent: Oct. 3, 2017

(54) ADDITION SYSTEM

(71) Applicant: Johnson Matthey Process Technologies, Inc., Savannah, GA (US)

(72) Inventors: Martin Evans, Tolland, CT (US); Rahul Jagannath Prasad, Gujarat (IN); Manishkumar Jayantilal Joshi, Gujarat (IN)

(73) Assignee: Johnson Matthey Process Technologies, Inc., Savannah, GA (US)

( * ) Notice: Subject to any disclaimer, the term of this patent is extended or adjusted under 35 U.S.C. 154(b) by 0 days.

(21) Appl. No.: 15/014,325

(22) Filed: Feb. 3, 2016

(65) Prior Publication Data

US 2016/0228837 A1    Aug. 11, 2016

Related U.S. Application Data

(60) Provisional application No. 62/113,805, filed on Feb. 9, 2015.

(51) Int. Cl.

| | |
|---|---|
| *B01J 8/00* | (2006.01) |
| *G01F 11/00* | (2006.01) |
| *G01G 17/04* | (2006.01) |
| *B67C 11/04* | (2006.01) |
| *B65G 65/23* | (2006.01) |
| *B65G 65/32* | (2006.01) |
| *C10G 11/18* | (2006.01) |

(52) U.S. Cl.
CPC .............. *B01J 8/003* (2013.01); *B65G 65/23* (2013.01); *B65G 65/32* (2013.01); *B67C 11/04* (2013.01); *C10G 11/18* (2013.01); *C10G 11/187* (2013.01); *G01F 11/003* (2013.01); *G01G 17/04* (2013.01); *B01J 2208/00539* (2013.01); *B01J 2208/00619* (2013.01); *B01J 2208/00752* (2013.01)

(58) Field of Classification Search
CPC ................................ B01J 8/003; B01J 8/0015
See application file for complete search history.

(56) References Cited

U.S. PATENT DOCUMENTS

| | | | | |
|---|---|---|---|---|
| 2,467,162 | A | * | 4/1949 | Schutze ................... B01J 27/06 502/169 |
| 3,137,402 | A | * | 6/1964 | Gunn, Jr. ............... B65G 65/23 222/165 |
| 6,859,759 | B2 | | 2/2005 | Evans |
| 7,050,944 | B2 | | 5/2006 | Evans |
| 7,606,678 | B2 | | 10/2009 | Evans |

(Continued)

FOREIGN PATENT DOCUMENTS

| | | |
|---|---|---|
| GB | 922556 | 4/1963 |
| GB | 962482 | 7/1964 |

(Continued)

*Primary Examiner* — Lessanework Seifu
(74) *Attorney, Agent, or Firm* — Kevin M. Carroll

(57) ABSTRACT

An addition system for introducing particulate material into an industrial process is disclosed. The addition system comprises a vessel for holding the particulate material, a weighing device, piping, a controller, and a frame to support the piping. The piping comprises a first valve for transferring the particulate material to the industrial process, and a second valve for transferring a first stream of pressurized gas from a source of pressurized gas to the vessel. The vessel comprises a filling nozzle located on the top of the vessel.

15 Claims, 4 Drawing Sheets

Addition System

(56) References Cited

U.S. PATENT DOCUMENTS

| | | | | |
|---|---|---|---|---|
| 7,815,867 | B2 * | 10/2010 | Elliott | C10G 11/187 208/146 |
| 8,097,213 | B2 * | 1/2012 | Vierheilig | B01J 8/0015 177/50 |
| 8,099,259 | B2 | 1/2012 | Evans | |

FOREIGN PATENT DOCUMENTS

| | | |
|---|---|---|
| GB | 1037968 | 8/1966 |
| GB | 1152235 | 5/1969 |
| WO | 0105496 A1 | 1/2001 |

* cited by examiner

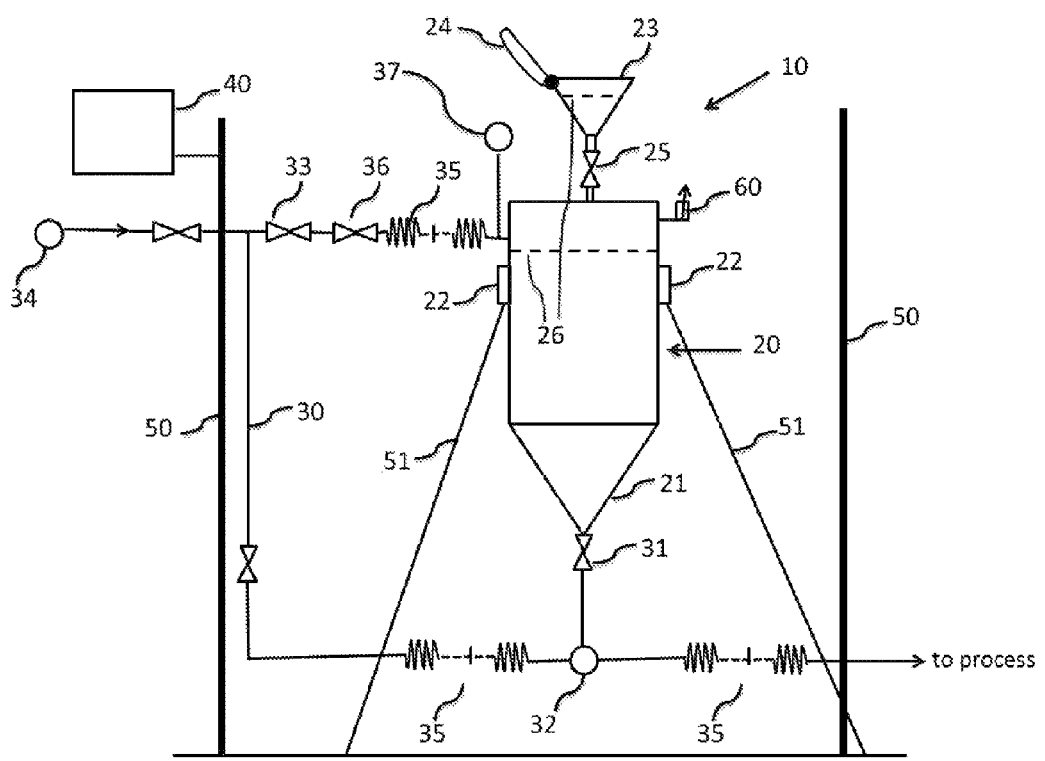
FIG. 1: Addition System

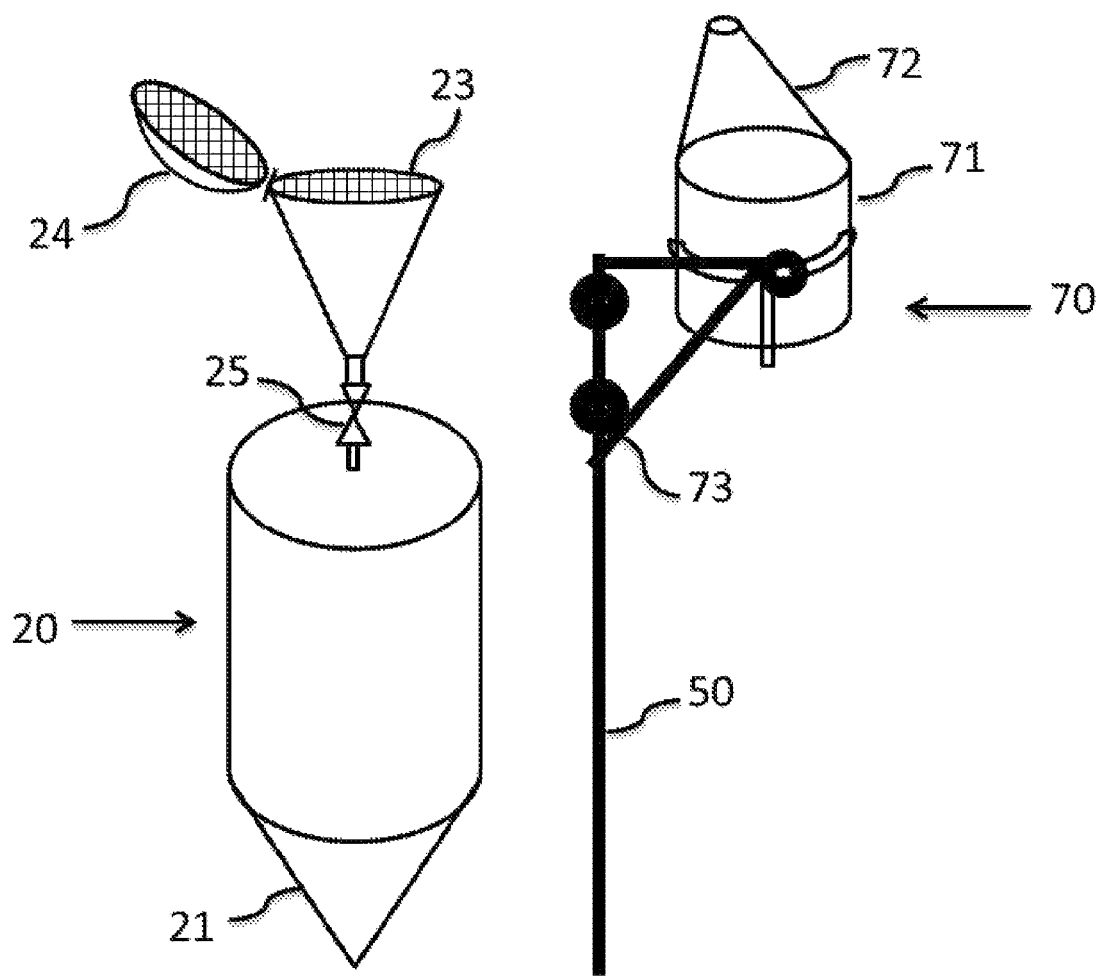
FIG. 2: Addition System with Particulate Emptying Device

FIG. 3: Addition System with Connected Particulate Emptying Device and Funnel Adapter
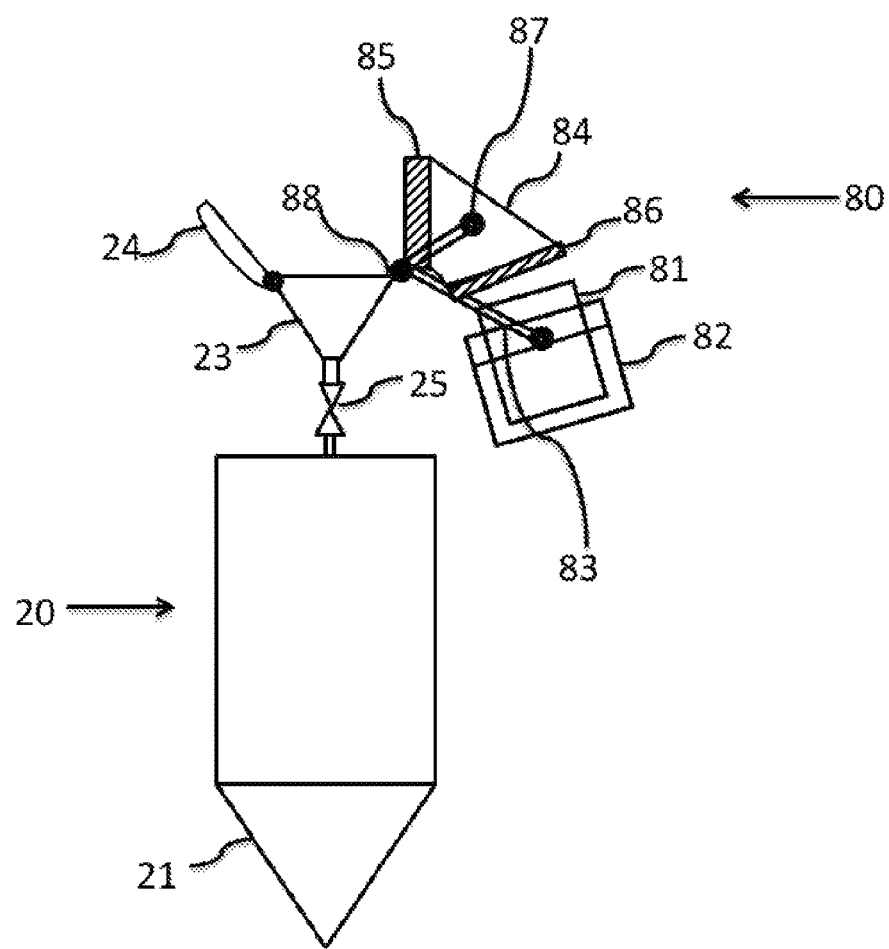

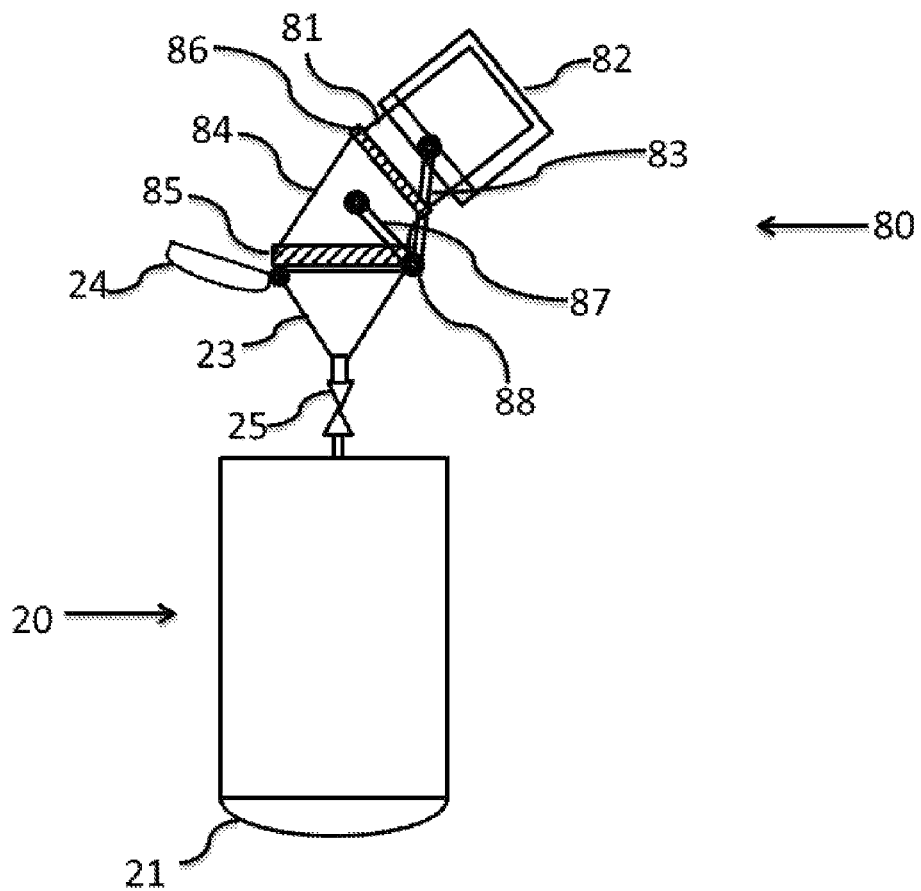
FIG. 4: Connected Particulate Emptying Device and Funnel Adapter in Refill Position

ADDITION SYSTEM

FIELD OF THE INVENTION

The invention is an addition system for adding particulate matter to industrial processes, such as a fluid catalytic cracking ("FCC") process, where small amounts of powder need to be added in a controlled manner.

BACKGROUND OF THE INVENTION

Refiners and other industrial manufacturers who add powdered catalyst additives to their processes at a rate of 20 lb/day or greater are well served by the technology available on the market today. In such applications, catalyst and additive suppliers normally supply their smallest standard addition system (for example, 50 ft$^3$ (1.5 ton) capacity) such that the catalyst or additive are supplied to the industrial process in 1 ton tote bins, 1 ton supersacks, or open-topped 55 gallon drums. The catalyst or additive is most commonly transferred from these shipping containers into the addition system using a vacuum ejector built into the addition system, although pressurized and gravity unloading are practiced.

For processors who want to add less than about 20 lb/day, the above method is not practical. The weight resolution of the addition system is not sensitive enough, and shipping a 2,000 lb tote bin or supersack for a 10 lb/day application would mean ordering 200 days worth of catalyst or additive at a time. This is not cost effective.

Currently, industrial processors typically have two options to handle small quantities of catalyst or additives. One option is to receive the additive deliveries loose in open topped 55 gallon drums or 20-40 lb pails, and an operator would then need to scoop the additive out using a ladle or similar device, and add it to the process using a manual shot pot. Alternatively, industrial processors could receive the additive deliveries in pre-packaged plastic bags, typically containing between 1 lb to 5 lb each. These would be cut open by the operator using a knife, and added to the process using the same type of manual shot pot as above.

Unfortunately, both of these solutions have some significant drawbacks. Specifically, these processes lead to a lot of waste through accidental spillage, as the operator is often unable to completely empty loose material from the shipping containers, or the bags cannot be emptied completely, or are partially spilled when opened incorrectly. The catalyst and additives that are added in small amounts are typically very expensive (between $25 and $75 per lb) and so any such losses can be of significant financial consequence.

In addition, these processes have a high risk of exposing the operator to high levels of ambient dust. This is unavoidable due to the high level of close proximity manual handling involved. This requires the operator to wear extra protective equipment, which is time consuming to don and often uncomfortable to wear in hot climates. For this reason, such operations are not always done as per procedure, causing an uncontrolled health risk.

An additional problem is that there is no automatic recording of how much of these expensive additives are used. The industrial processor has to rely on written operator logs, which are notoriously poorly kept. This causes several more problems for the processor because assessing the effectiveness of these additives requires detailed knowledge of when they were added, and how much was added. Without this, the processor cannot assess if the additive is working correctly, or whether a newer version is really as effective as expected, thereby justifying a higher price (for example). Also, there is no automatic inventory control, which means that stocktaking must be done manually. Additives used in small amounts like this are frequently neglected, and so the processor frequently runs out, causing a need for emergency express deliveries at exorbitant cost.

Some processes require additions to be made in small amounts every few hours for maximum process stability. Relying on an operator to do this is risky, as people have a habit of forgetting to add, or not going out to do this in inclement weather. With paper records it is impossible to prove what happened either way.

The FCC process requires careful monitoring to ensure maximum reliability. Excessively high temperatures in the regenerator are a frequent cause of premature shutdowns, which typically cost millions of dollars per. day. Monitoring these temperatures without knowing the amount of catalyst or additive being added to control them is at best only partially effective, and so this lack of automatic monitoring of additive additions puts the process at increased risk of high financial losses from premature shutdowns.

It is therefore desirable to attain an improved method and addition system to add small amounts of catalyst and additives into industrial processes, including the FCC process. We have discovered a new addition system and method to add catalyst and additives into the industrial processes.

SUMMARY OF THE INVENTION

The invention includes an addition system for introducing particulate material into an industrial process. The addition system comprises a vessel for holding the particulate material, a weighing device, piping, a controller, and a frame to support the piping. The piping comprises a first valve for transferring the particulate material to the industrial process, and a second valve for transferring a first stream of pressurized gas from a source of pressurized gas to the vessel. The vessel comprises a filling nozzle located on the top of the vessel. Optionally, a pail unloading device is attached to, or located alongside the addition system to enable the system to be refilled with particulate material, either automatically or manually. Preferably, this addition is refilled from disposable plastic pails, which are also used as the shipping container to transport the particulate material to the site of the industrial process.

BRIEF DESCRIPTION OF THE DRAWINGS

FIG. 1 shows an embodiment of the addition system of the invention.

FIG. 2 shows the combination of the vessel of the addition system with a particulate material emptying device.

FIG. 3 shows an embodiment where the particulate material emptying device and a funnel adapter are connected to the filling nozzle located on the top of the vessel of the addition system in the open position.

FIG. 4 shows the addition system of FIG. 3 in which the funnel adapter and bucket are in the position to allow for the addition of particulate material to the funnel, and the bottom of vessel (20) is shown as a dished-end bottom (21).

DETAILED DESCRIPTION OF THE INVENTION

The invention includes an addition system for introducing particulate material into an industrial process. Preferable industrial processes include manufacture of pyridine and its derivatives the manufacture of acrylonitrile, fluid catalytic cracking (FCC) processes, and other chemical manufacturing processes. The invention is particularly suited to introduce particulate material into a fluid catalytic cracking (FCC) process.

The addition system comprises a vessel for holding the particulate material. The vessel has a top and a bottom. An easy to open filling nozzle is located at the top of the vessel. Preferably, the filling nozzle comprises a valve and funnel as shown in FIG. 1. Other similar arrangements may also be used. A hinged or detachable cover is preferably located on the top of the filling nozzle to prevent rain or other contaminants from entering the funnel. The cover is preferably hinged in order to allow easy opening and closing of the cover during and following loading of the filling nozzle. The bottom of the vessel is preferably cone-shaped in order to allow easy flow of the particulate material out of the vessel for movement into the industrial process, although other shapes (such as dished ends) can be used.

The funnel optionally contains a removable or fixed strainer or filter, which prevents large pieces of debris or catalyst from entering the vessel and blocking the outlet valve. In one configuration, this filter or strainer is located within the vessel itself. Cleaning of the strainer which is located within the vessel is carried out either by vacuuming the debris out using a hose inserted through the filling nozzle, or by using a separate access port located on the top or side of the vessel, above the level of the strainer. Optionally, the whole top head of the vessel can be removed to allow access to this strainer, or to remove debris that has made its way into the vessel.

The vessel is preferably sized to contain less than 100 lb of particulate material, more preferably less than 30 lb of particulate material.

The addition system also comprises piping. The piping comprises a first valve for transferring the particulate material to the industrial process. Preferably, the first valve is a metering valve. Suitable metering valves include the Thomson Valve II or the Teravalve XL. Preferably, the addition system also comprises a metering device interfaced with the vessel. The piping also comprises a second valve for transferring a first stream of pressurized gas from a source of pressurized gas to the vessel.

The pressure in the addition system is preferably controlled at a constant level, as this affects the accuracy of the indicated weight. If the pressure of the gas supply cannot be relied on to be constant, then this pressure control can be accomplished by using a mechanical pressure regulator, or it can be accomplished electronically using the controller.

The addition system also comprises a controller, which is preferably a CPU (central process unit) or a micro-PLC (programmable logic controller), and more preferably a micro-PLC. The controller can be connected to an automated database, such as the Intercat AIM (Additive Inventory Management) database using a data link as for easy access to the data for the industrial process, or to the refinery DCS (distributed control system) system. Methods of controlling addition systems are taught in U.S. Pat. Nos. 7,050,944, 8,099,259, 7,606,678, and 6,859,759, the teachings of which are incorporated herein by reference.

The addition system also comprises a frame. The frame supports the piping, and optionally the controller.

The addition system also comprises a weighing device. Preferably, the weighing device comprises one or more load cells. Preferably, the load cells are mounted on the vessel and supported on the frame. Alternatively, the load cells are mounted on the vessel and supported off the ground on one or more legs. The conventional location of load cells is at the bottom of the addition system, often on the ground. The advantage of mounting the load cells on the vessel itself (for example supported off the ground on one or more legs) is added stability in weighing the filled vessel.

Preferably, the piping comprises quick disconnect couplings with flexible hosing and tubing as opposed to metal piping. The flexible hoses and tubing prevent the measured weight of the vessel being affected by external loads, for example any loads applied to the frame, or to the connecting piping. This results in more accurate weight readings, and thereby more precise additions. The use of quick disconnect couplings allows for easy disassembly of the piping from the vessel in order to carry out maintenance.

Preferably, the addition system further comprises a particulate material emptying device to load the particulate material into the filling nozzle. The particulate material emptying device preferably comprises a bucket to contain the particulate material and a funnel at the top of the bucket. The funnel is preferably a separate piece that can be attached and removed from the top of the bucket for filling the bucket with particulate matter and emptying the bucket into the filling nozzle. The particulate material emptying device is preferably supported on the frame and secured to the frame on a pivot that allows the bucket to empty into the filling nozzle. The bucket preferably consists of a disposable plastic pail of 20-50 lb capacity, which is also used as the shipping container to transport the particulate material to the industrial process unit. This allows for more economical shipping, and such a container can more easily be transported or carried by an operator, avoiding the need for fork lift trucks or other expensive transportation aids.

In another embodiment, the particulate material emptying device comprises a funnel adapter, a tilting cradle and the bucket. The funnel adapter and tilting cradle are connected to the filling nozzle on a hinge through a separate funnel clamp and a tilting cradle clamp. The funnel adapter preferably contains a rubber gasket or seal to secure the funnel to the top of the filling nozzle and a second rubber gasket or seal to secure the bucket to the funnel adapter to the bucket when the particulate matter is emptied into the filling nozzle.

The funnel adapter preferably contains an internal wall that allows the control of particulate material drainage when tilted, and may preferably contain an internal sliding seal that may be opened to allow catalyst to drain into the filling nozzle when re-fill is necessary. The internal slide seal may be controlled by a push/pull handle on the side of the funnel adapter.

Preferably, the particulate material emptying device is manually operated, although it can be controlled by the controller.

FIG. 1 is a simplified schematic of one embodiment of the addition system (10) showing the vessel (20) wherein the bottom of the vessel is cone-shaped (21). A filling nozzle is located at the top of the vessel, consisting of a funnel (23) with a hinged cover (24) shown in the open position, and a valve (25) that when open allows the particulate matter to flow into the vessel. Optional filter/strainers (26) are shown in both the funnel (23) and within the vessel (20). Load cells (22) are located on the vessel itself, to act as weighing devices. The load cells may optionally be supported on the frame (50), or off the ground on one or more optional legs (51). The piping (30) of the addition system comprises a first valve (31) that when open allows for the transfer of particulate material from the vessel to the industrial process. The addition system also contains a metering device (32) interfaced with the vessel and configured to provide a metric indicative of an amount of particulate material transferred from the vessel to the industrial process, as well as a second valve (33) that when open allows for the transfer of a stream of pressurized gas from a pressurized gas source (34) to the vessel. An optional pressure regulator valve (36) may be added into the piping as well. This regulator may be operated by the controller (40) using an optional pressure measuring and transmitting device (37).

FIG. 1 also shows optional flexible hosing (35) that allows for the precise weighing of the vessel (and any particulate material in the vessel), as well as an optional safety valve (60) for releasing a build-up of pressure within the vessel.

A controller (40) such as a CPU or micro-PLC (programmable logic controller) can be used to control the operation of the addition system, including pressurizing the vessel, metering a controlled amount of particulate material into a reactor of the industrial process, and recording the vessel weight information. Preferably, the controller is a micro-PLC.

A frame (50) that supports the piping and optionally can support the controller is also shown.

FIG. 2 shows one embodiment of the addition system comprising a particulate material emptying device (70) to load the particulate material into the funnel (23) of the filling nozzle when the hinged cover (24) is open. Valve (25) controls the flow of particulate matter from the funnel into the vessel (20) having a cone-shaped bottom (21). A bucket (71) to contain the particulate material and a connectable funnel (72) at the top of the bucket are shown. The bucket of the particulate material emptying device is supported on the frame and secured to the frame (50) on a pivot (73) that allows the bucket to empty into the vessel.

FIG. 3 shows another embodiment of the addition system comprising a particulate material emptying device (80) to load the particulate material into the funnel (23) of the filling nozzle when the hinged cover (24) is open. Valve (25) controls the flow of particulate matter from the funnel into the vessel (20) having a cone-shaped bottom (21). The bucket (81) is secured in a tilting cradle (82) that is attached to the vessel by a cradle clamp (83) that is secured to the bucket and a hinge (88) on the top of the funnel (23). The addition system also has a funnel adapter (84) that is also attached to the funnel (23) by a funnel clamp (87) that is also secured to the funnel at the hinge (88) at the top of the funnel. The funnel adapter (84) has a first rubber gasket or seal (85) that can secure the funnel adapter to the top of the funnel during particulate material addition and a second rubber gasket or seal (86) to secure the bucket to the funnel adapter.

FIG. 4 shows the addition system of FIG. 3 in which the funnel adapter and bucket are in the position to allow for the addition of particulate material to the funnel.

The addition system of the invention provides numerous advantages. The particulate material (such as catalyst or additive) can be added to the industrial process in a controlled manner, and records can be kept inside the controller on a flash memory device or similar technology. These records can be uploaded very easily to the record keeping system of the process. The controller on this system can be connected to an automated database, such as the Intercat AIM (Additive Inventory Management) database using a data link as for easy access to the data for the operator. In addition, the amount of catalyst or additive to be added can be set to go in automatically at regular intervals, or can be added on demand. In both cases, accurate records are kept of the amount and exact time of each addition. This extra flexibility is extremely valuable to an operator.

Because of the high accuracy of this small addition system, these expensive catalysts and additives can now be added in doses as small as 0.1 lb, which is significantly smaller than the 1 lb or 5 lb bags that are commonly used today. This provides an additional cost saving to the industrial process. Finally, operator exposure to dust is minimized, thereby reducing EHS (environmental, health and safety) issues.

We claim:

1. An addition system for introducing particulate material into an industrial process, said addition system comprising:
    (a) a vessel for holding the particulate material, wherein the vessel has a top and a bottom and the vessel comprises a filling nozzle located on the top of the vessel;
    (b) a weighing device;
    (c) piping that comprises a first valve for transferring the particulate material from the vessel to the industrial process, and a second valve for transferring a first stream of pressurized gas from a source of pressurized gas to the vessel;
    (d) a controller for controlling operation of the addition system;
    (e) a frame to support the piping and optionally the controller; and
    (f) a particulate material emptying device to load the particulate material into the filling nozzle,
    wherein the particulate material emptying device comprises a funnel adapter, a tilting cradle and a bucket; the funnel adapter is connected to the filling nozzle on a hinge through a funnel clamp; and the tilting cradle is connected to the filling nozzle on the hinge through a tilting cradle clamp.

2. The addition system of claim 1, wherein the filling nozzle comprises a funnel and a third valve.

3. The addition system of claim 1, wherein a hinged or detachable cover is located on top of the filling nozzle.

4. The addition system of claim 1, wherein the weighing device comprises one or more load cells.

5. The addition system of claim 4, wherein the load cells are mounted on the vessel and supported on the frame.

6. The addition system of claim 4, wherein the load cells are mounted on the vessel and supported off the ground on one or more legs.

7. The addition system of claim 1, wherein the piping comprises quick disconnect couplings with flexible hosing and tubing.

8. The addition system of claim 1, wherein the controller comprises a micro-PLC.

9. The addition system of claim 1, wherein the first valve is a metering valve.

10. The addition system of claim 1, further comprising a metering device interfaced with the vessel and configured to provide a metric indicative of an amount of particulate material transferred from the vessel to the industrial process.

11. The addition system of claim 1, wherein the particulate material emptying device is controlled by the controller.

12. The addition system of claim 1, wherein the funnel adapter contains a first rubber gasket or seal to secure the funnel to the top of the filling nozzle and a second rubber gasket or seal to secure the bucket to the funnel adapter.

13. The addition system of claim 1, wherein the bottom of the vessel is cone-shaped.

14. The addition system of claim 1, wherein the bottom of the vessel is a dished-end bottom.

15. The addition system of claim 1, wherein the industrial process is a fluid catalytic cracking process.

\* \* \* \* \*